United States Patent [19]
Takata

[11] Patent Number: 5,169,215
[45] Date of Patent: Dec. 8, 1992

[54] BRAKE SYSTEM
[75] Inventor: Koji Takata, Itami, Japan
[73] Assignee: Sumitomo Electric Industries, Co., Osaka, Japan
[21] Appl. No.: 615,852
[22] Filed: Nov. 20, 1990
[30] Foreign Application Priority Data
Nov. 20, 1989 [JP] Japan .................. 1-302589
[51] Int. Cl.⁵ .................................. B60T 8/44
[52] U.S. Cl. .................. 303/113.4; 180/197; 303/15; 303/93; 303/100; 303/105; 303/DIG. 4; 303/106; 303/113.2; 303/115.4; 303/116.1; 303/119.1
[58] Field of Search ........... 303/91, 93, 94, 113.55, 303/95, 96, 15, 97, 20, 98, 92, 99, 24.1, 100–110, 113 R, 119 R, 113 TR, DIG. 3, DIG. 4, 115 PP, 115 R, 113 AP, 113 SS:116 R; 60/545; 188/181 C, 181 A, 197, 181 R, 358, 359

[56] References Cited
U.S. PATENT DOCUMENTS

| 3,671,082 | 6/1972 | Stevens ............ 303/113 SS |
| 3,790,225 | 2/1974 | Wehde ............. 303/113 SS |
| 4,404,633 | 9/1983 | Goicoechea ....... 303/93 X |
| 4,435,021 | 3/1984 | Hoenick ........... 303/93 X |
| 4,610,484 | 9/1986 | Amberg et al. .... 303/97 X |
| 4,725,953 | 2/1988 | Rolland et al. .... 303/93 X |
| 4,768,841 | 9/1988 | Watanabe ......... 303/113 SS |
| 4,940,291 | 7/1990 | Sato ............... 303/15 |
| 4,976,500 | 12/1990 | Cogswell, II et al. . |
| 5,031,968 | 7/1991 | Takata ............ 303/100 X |
| 5,040,852 | 8/1991 | Takata ............ 303/100 |

FOREIGN PATENT DOCUMENTS 0429066 5/1991 European Pat. Off. ...... 303/113 SS
2064562 7/1971 Fed. Rep. of Germany ........ 303/93

Primary Examiner—Douglas C. Butler
Attorney, Agent, or Firm—Wenderoth, Lind & Ponack

[57] ABSTRACT

A brake system wherein an auxiliary power based on a manual force is electronically controlled to control the braking force so as to obtain braking effects corresponding to a manual control input. The braking force is controlled so that a vehicle deceleration corresponding to the control input can be obtained when the control input is equal to or greater than a comparatively small predetermined control input value Lo. When the control input is smaller than Lo, the braking force is controlled so that the vehicle acceleration will not exceed a value corresponding to the control input.

5 Claims, 4 Drawing Sheets

BRAKE SYSTEM

BACKGROUND OF THE INVENTION

This invention relates to an improvement in a brake system in which a manual control input such as a pedal stroke is detected and braking is electronically controlled so as to generate an effect such as vehicle deceleration corresponding thereto.

The basic construction of such known types of brake systems is typically illustrated in FIG. 4. The operation of a manual control input means, such as a brake pedal 31, is detected by a pedal stroke sensor or pedal force sensor 32, and the information is fed into an electronic control unit 33. The information from a wheel speed sensor 34 and a gravitation type acceleration/deceleration sensor 35 and a brake pressure sensor 36 is also fed into the electronic control unit. The electronic control unit determines a target deceleration corresponding to the control input based on a predetermined relationship, compares this target with the actual deceleration obtained from the wheel speed sensor, and a gravitation type acceleration/deceleration sensor, if provided, and gives a signal to a hydraulic modulator 37 to increase or decrease the brake fluid pressure. The hydraulic modulator controls the extent of the introduction of power fluid from an auxiliary power source 38 by operating an inlet valve and an exhaust vale 39 contained in the modulator, so as to increase or decrease the pressure prevailing in a wheel brake 40 according to the signal given by the electronic control unit to thus obtain the target deceleration.

This type of brake system has excellent controllability and reliability because the braking effect corresponding to the control input can always be obtained irrespective of the payload on the vehicle or changes in the frictional coefficient of the friction material of the brake.

But since a control input is always related to a certain level of vehicle deceleration, problems will arise during braking on a slope. Namely, while going down a slope, a given amount of braking force is required to only keep the vehicle running at a constant speed. However, when the manual brake control means are operated in an attempt to generate such a braking force, the brake fluid pressure will be controlled automatically so that a deceleration corresponding to the central input will be generated. Thus the vehicle will be decelerated instead of running at a constant speed.

SUMMARY OF THE INVENTION

An object of the present invention is to provide a brake system which solves the above problem.

In accordance with the present invention, there is provided a brake system wherein an auxiliary power is electronically regulated to effect a braking force generating braking effects corresponding to a manual control input, characterized in that when the control input is equal to or greater than a predetermined control input value Lo, the vehicle deceleration will be maintained of a value corresponding to the control input and, when the control input is smaller than Lo, the braking force is controlled so that the vehicle acceleration will not exceed a value corresponding to the control input.

BRIEF DESCRIPTION OF THE DRAWINGS

Other features and objects of the present invention will become apparent from the following description taken with reference to the accompanying drawings, in which:

FIG. 1a shows the case wherein $L_o$ is one point, and FIG. 1b shows the case wherein the $L_o$ covers a wider range;

DETAILED DESCRIPTION OF THE PREFERRED EMBODIMENT

Namely, while the control input is smaller than Lo, the braking force is kept at zero as long as the vehicle acceleration is smaller than a predetermined value corresponding to the control input at that time. In other words, in this area, the vehicle is allowed to be accelerated even if it is going down a slope. When the vehicle acceleration exceeds this predetermined value, braking pressure is applied to restrict the acceleration to this valve. On the other hand, when the control input is larger than $L_o$, ordinary brake control is carried out; that is, the vehicle deceleration is maintained at a predetermined deceleration value corresponding to the control input.

The quantity of the manual control input can be detected either in the form of a pedal stroke or a pedal force (by providing a suitable sensor which can detect either).

Thus, according to the present invention, the permissible acceleration and target deceleration can be predetermined according to either the brake pedal stroke or to the brake pedal force.

With an ordinary brake system without any stroke/deceleration control, because of play in the brake device, a given amount of pedal stroke is usually required before an effective brake fluid pressure is generated.

When performing a stroke/deceleration control, brake fluid necessary for the initial brake pressure rise is generally supplied from a dynamic pressure source. Thus the play in the pedal stroke could be reduced to any desired level. The stroke/deceleration control acceleration permissible area according to the present invention can be achieved by utilizing a part or all of this play shortening patential.

On the other hand, when performing the pedal force/deceleration control, a part of the pedal force which is normally ineffective due to the counterforce of a return spring can be utilized as the acceleration permissible area.

The vehicle deceleration referred to in the present invention is related to the relative speed between the vehicle and the road surface and is usually calculated from the rotating speed of the wheels. But if the rotating speed is not accurately indicating the speed against the road surface owing to a slipping or spinning of the wheels, it is desirable to correct the vehicle deceleration calculated from the wheel speed by using the signals from an acceleration/deceleration sensor of a gravity type.

When, on the other hand, the wheel speed is precisely indicating the speed relative to the ground, the gravity type acceleration/deceleration sensor can be corrected based on the acceleration or deceleration calculated from the wheel speed.

Of course, an absolute vehicle speed sensor utilizing the Doppler effect, etc. may be used.

Figure 1A:
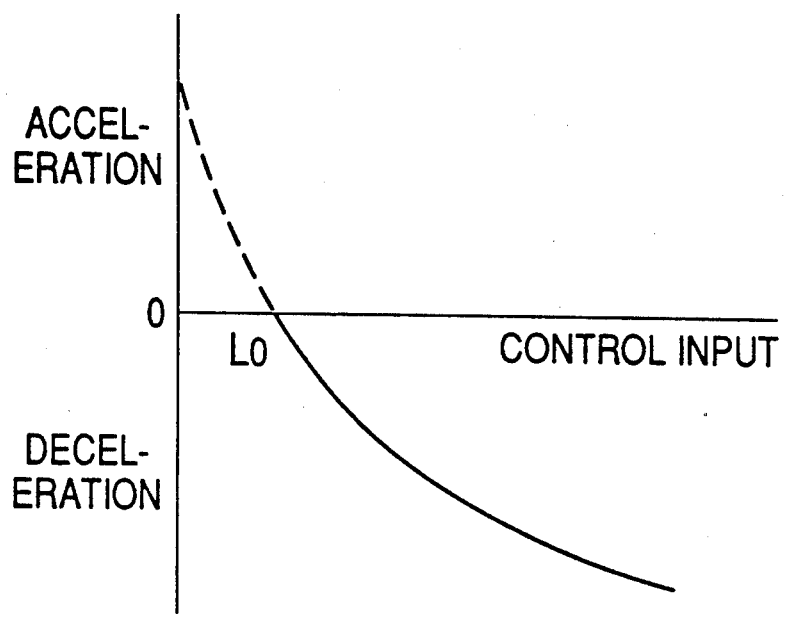
FIGS. 1a and 1b are diagrams showing the target levels of the control input/acceleration-deceleration in the system according to the present invention; specifically.
Figure 1B:
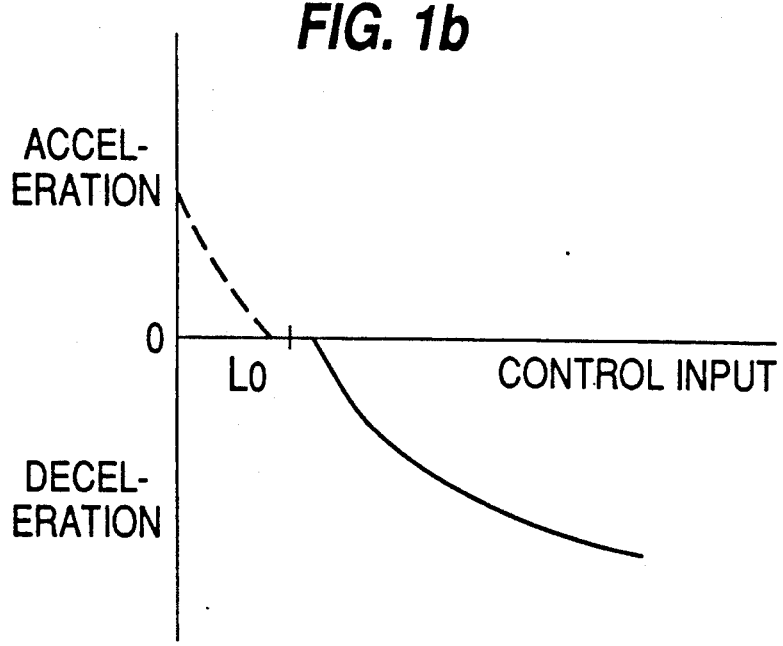

FIGS. 1a and 1b are graphs showing the permissible and target levels for the control input/acceleration-deceleration control according to the present invention.

At the portion shown by a solid line, where the control input is larger than $L_o$, the brake fluid pressure is controlled so as to effect a deceleration corresponding to the control input.

On the other hand, at the portion shown by a dotted line, where the control input is smaller than $L_o$, the braking fluid pressure is kept at zero while the acceleration is smaller than a predetermined value corresponding to the control input at that time, whereas if the acceleration exceeds this predetermined value, the brake fluid pressure is controlled to maintain the acceleration at this predetermined value.

With this arrangement, the acceleration or deceleration becomes zero when the control input is $L_o$. This allows the vehicle to go down a slope at a constant speed, neutralizing the acceleration caused by the gravity component of the slope.

The range of $L_o$ may be a point as in FIG. 1a or may cover some range as in FIG. 1b.

The maximum permissible acceleration when the control input is zero has to be set at least slightly larger than the limit of the acceleration capacity of the vehicle so as not to interrupt sharp acceleration of the vehicle.

Figure 2:
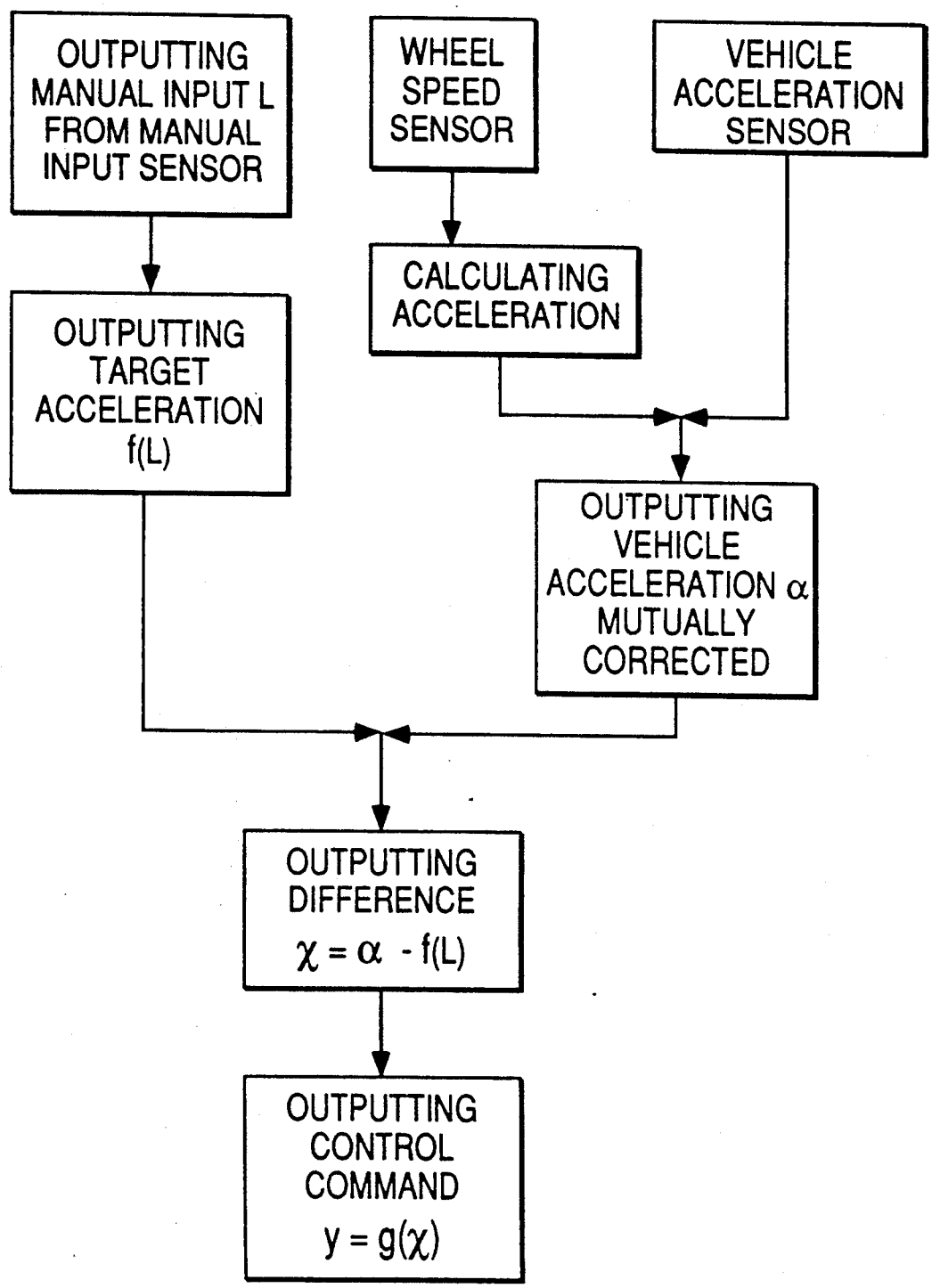
FIG. 2 is a block diagram showing how control is performed.

Next, how the brake system is controlled according to the present invention will be described with reference to FIG. 2.

The target acceleration f(L) is determined from the manual control input L, based on a predetermined relationship as shown in FIGS. 1a and 1b. (The deceleration is expressed as a negative value of acceleration). On the other hand, the vehicle acceleration is determined by calculations from the wheel speeds and correcting the calculations by means of a gravitation type acceleration/deceleration sensor, the output of which can be corrected on the basis of the calculated value (mutual correction as already explained).

Generally, the use of the term "controlling" refers to determining the difference ($\kappa$) between the actual value ($\alpha$) and the target value (f(L)) and issuing a control command $y=g(\alpha)$ to the elements to be controlled (in this case, the valves 11 in FIG. 3 described below).

According to the present invention, when $L>L_o$, f(L) is set to below zero ($<O$). If the absolute value of the deceleration is insufficient, since $\kappa>0$, the control command y will be a command to increase the braking force. If it is excessive, since $\kappa<0$, the control command will be a command to decrease the braking force.

When $L<L_o$, f(L) is set to above zero ($>0$). If the absolute value of the acceleration is excessive, since $\kappa>0$, the control command y will be a command to increase the braking force. If it is insufficient, it will be a command to decrease the braking force.

When the condition $L<L_o$ and $\alpha<f(L)$ continues, which means that, if decrease in the braking force does not increase the acceleration sufficiently, namely, the accelerator pedal is not trod sufficiently, the command to decrease the braking force will continue and the brake pressure will become zero. So long as the command to decrease the braking force continues, i.e. the condition $L-L_o$ and $\alpha<f(L)$ continues brake pressure will be kept at zero.

Figure 3:
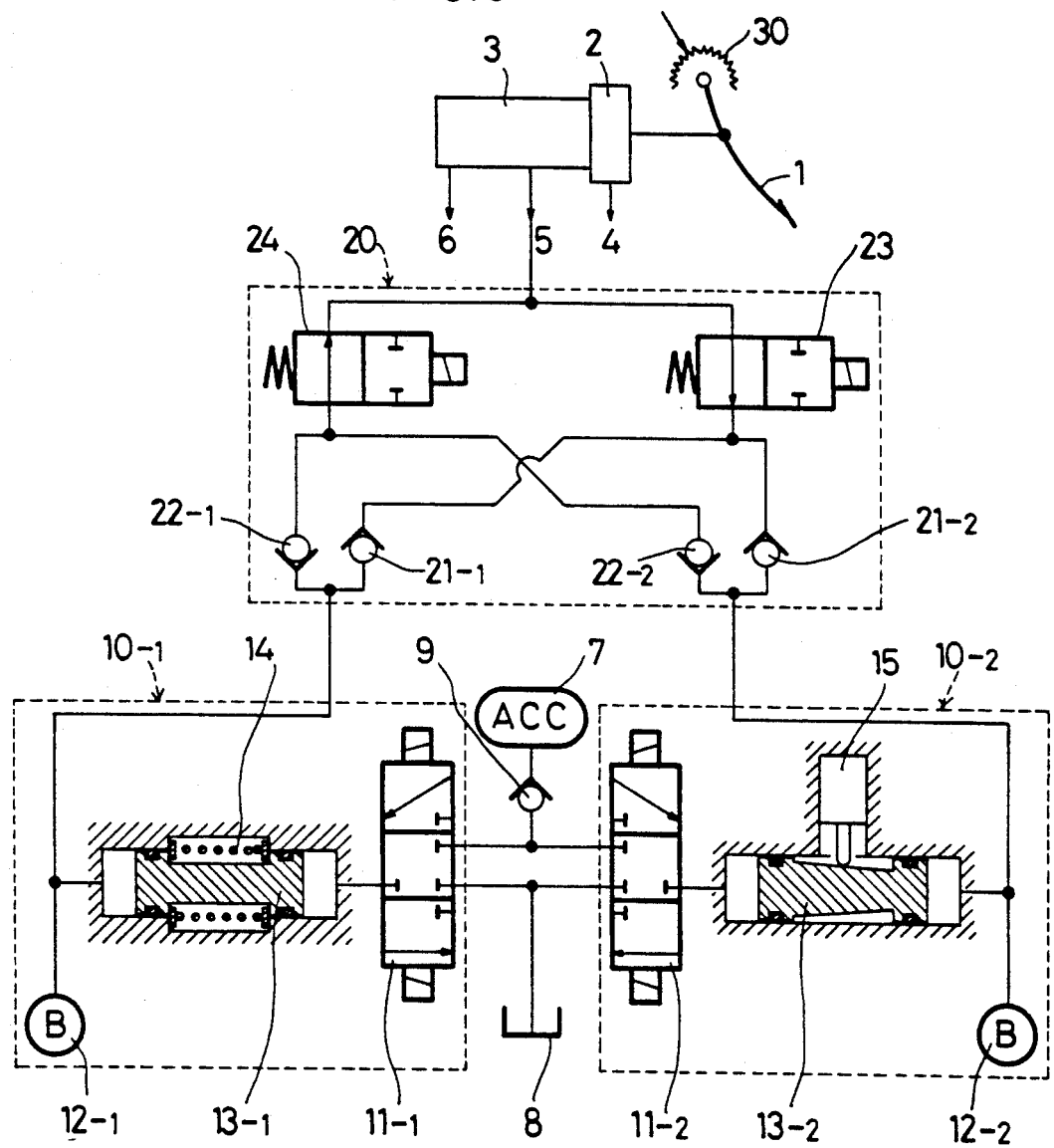
FIG. 3 is a diagram of an embodiment of a brake system to which this invention is applicable.
Figure 4:
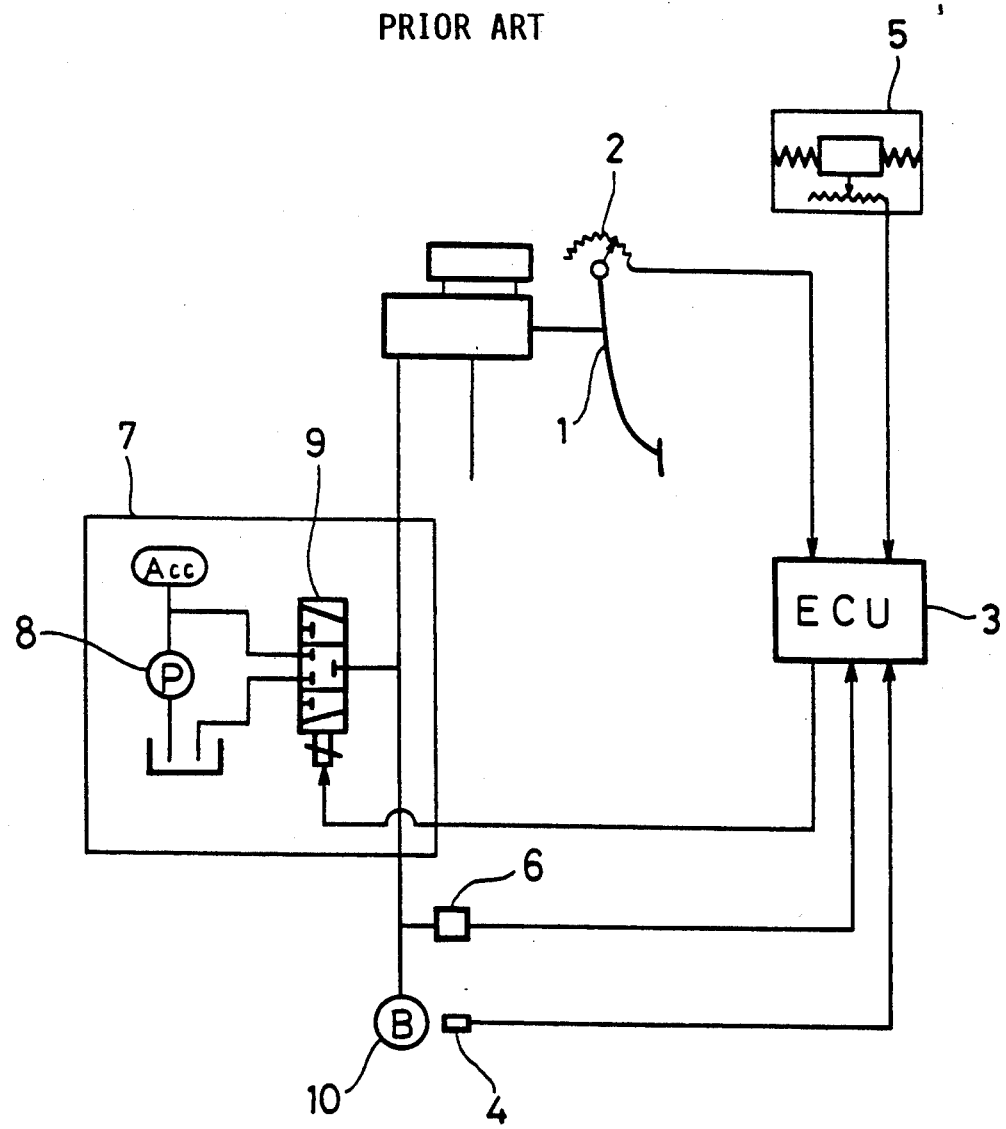
FIG. 4 is an illustration of a prior art brake system.

A brake system suitable for carrying out the present invention is shown in FIG. 3 by way of example.

The system shown in this figure was proposed by the present applicant in U.S. patent application Ser. No. 07/574283, now abandoned in which the control stroke and the vehicle deceleration are correlated with each other.

By operating a pedal 1, a brake fluid pressure is output to a dynamic pressure line 4 and a static pressure line 5 from brake pressure generators 2 and 3 (3 is a master cylinder and 2 is a booster for transmitting the pedal force after amplifying it).

A tandem master cylinder may be used to provide two output circuits, i.e. two static pressure lines 5. Or else, the circuit may consist of three lines 4, 5 and 6.

As shown in FIG. 3, one or more brake circuits 10 to be controlled are connected to each pressure line 5. Each brake circuit has one flow control valve 11 adapted to be closed in either of two directions when deactivated and one or more wheel brakes 12 associated with the valve 11.

The flow control valves 11 serve to open and close communication between a dynamic pressure source 7 and a reservoir 8 with the respective circuits 10. With this arrangement, the fluid pressure to the brakes 12 of the respective circuits 10 can be electronically controlled by introducing fluid, which is an auxiliary power other than a manual force, from the source 7 into the circuits 10 via a check valve 9 to drive pistons 13 or by discharging the fluid from the circuits 10 to the reservoir 8 to retract the pistons 13. As can be seen from the fluid circuit arrangement however, fluid pressure from the manual force applied to the pedal, through static line 5, can also be applied to the brakes 12. Thus if the fluid power from dynamic pressure source 7 should fail, at least a partial braking power can still be applied by further operation of the pedal 1.

In the embodiment, the driving pistons 13 prevent the static pressure and dynamic pressure from mixing together. But if such mixing is permissible, the pistons may be omitted. A spring 14 or a stroke sensor 15 may be provided for the driving pistons 13.

In the figure, the two brake circuits 10-1 and 10-2 to be controlled include the wheel brakes 12-1 and 12-2, respectively, and are connected to the single pressure line 5. A pressure line network 20 is provided between the circuit 5 and the brake circuits 10 to be controlled.

The circuit network 20 comprises check valves 21-1 and 21-2 for fluid introduction, check valves 22-1 and 22-2 for fluid return, a solenoid changeover valve 23 for antilock control provided upstream of the check valves 21 for fluid introduction and solenoid changeover valve 24 for automatic braking (such as traction control) provided upstream of the check valves 22 for fluid return.

A stroke sensor 30 for facilitating pedal stroke shortening control is provided on a brake pedal 1 or a member associated therewith.

Though not shown in the figure, these flow control valves, solenoid changeover valves and sensors (most of them are not shown) are all connected to an electronic control unit (not shown).

When pressure is introduced from the dynamic pressure source 7 into the brake circuits 10 to be controlled by activating the flow control valves 11, and with the solenoid changeover valves 23 and 24 kept open, the brake pedal will be pushed back. Thus, in normal conditions, i.e. while direct electronic pressure control such as antilock control or traction control is not being effected, the pedal stroke can be shortened so as to be in a predetermined relation with respect to the braking effect such as deceleration.

In this brake system, if, during antilock control, the output pressure in the pressure line 5 is higher than the pressure in the controlled brake circuits 10, the pressure in each brake circuit is controlled independently by means of the respective flow control valve 11.

But when the output pressure drops below the pressure in the controlled brake circuits as a result of the relaxation of the pedal force, fluid will flow out of the controlled brake circuits 10 back into the pressure line through the check valves 22, thereby reducing the brake pressure. If the system is in the antilock control mode at this time, the flow control valves 11 will operate to keep introducing fluid from the dynamic pressure source 7 into the controlled brake circuits 10 in order to maintain the brake pressure at that time. The brake pedal is pushed back by this pressure. As the brake pedal is pushed back, it is detected that the driver has changed his will, so that the antilock control will be stopped.

During the automatic braking mode, when the pedal force increases as a result of a change in the driver's will, the brake pressure will increase instantly on the same principle. By detecting further movement of the brake pedal (the pedal is depressed in this case), the automatic braking can be stopped.

The system for carrying out the present invention is not limited to the one shown in the figure but may be of any desired configuration for electronically controlling the auxiliary power so as to obtain the braking effects corresponding to the manual control input.

What is claimed is:

1. A braking system for a wheeled vehicle, comprising
   a wheel brake means for braking a wheel;
   a manual control input means for manually setting a desired braking effect to be exerted by said wheel brake means, said manual control input means being manually operable to a variable quantity;
   a sensor means for sensing the quantity of operation of said manual control input means;
   a power means connected to said wheel brake means for providing braking power to said wheel brake means;
   a measuring means for measuring acceleration and deceleration of the vehicle, said measuring means comprising at least a wheel speed sensor; and
   an electronic control means for determining a target vehicle deceleration from the quantity of operation of said manual control input means sensed by said sensor means according to a predetermined relationship between the quantity of operation of said manual control input means and the target vehicle deceleration and controlling the provision of power from said power means to said wheel brake means to obtain a vehicle deceleration corresponding to said target vehicle deceleration, wherein when the quantity of operation of said manual control input means is smaller than a predetermined value $L_o$, the braking power to said wheel brake means is controlled so that vehicle acceleration is permitted up to a predetermined acceleration value corresponding to the quantity operation of said manual control input means, and wherein when the quantity of operation of said manual control input means is greater than said predetermined value $L_o$, the braking power to said wheel brake means is controlled so that vehicle deceleration is maintained at a predetermined deceleration value corresponding to the quantity of operation of said manual control input means.

2. The braking system of claim 1, wherein said manual control means has an operational stroke and said sensor means senses the extent of the stroke of said manual control input means.

3. The braking system of claim 1, wherein said manual control input means is operated by an applied force and said sensor means senses the amount of the force applied to said manual control input means.

4. The braking system of claim 1, wherein said measuring means comprises both said wheel speed sensor and an acceleration/deceleration sensor, said measuring means measuring the acceleration and deceleration of the vehicle from said acceleration/deceleration sensor when excessive wheel slip or wheel spin is detected by said wheel speed sensor, and said measuring means measuring the acceleration and deceleration of the vehicle and correcting said acceleration/deceleration sensor with said wheel speed sensor when excessive wheel slip or wheel spin is not detected by said wheel speed sensor.

5. The braking system of claim 1, wherein if said power means fails to provide braking power to said wheel brake means in an operation of said manual control input means, further operation of said manual control input means provides at least a partial amount of braking power to said wheel brake means.

* * * * *